United States Patent [19]

Ossi

[11] Patent Number: 5,101,919
[45] Date of Patent: Apr. 7, 1992

[54] STEERING SYSTEM FOR TRACKED VEHICLES

[75] Inventor: Ronald R. Ossi, Lissago, Italy

[73] Assignee: Avco Corporation, Providence, R.I.

[21] Appl. No.: 568,258

[22] Filed: Aug. 15, 1990

[51] Int. Cl.$^5$ .................. B62D 11/10; F16H 37/06
[52] U.S. Cl. ..................................... 180/6.2; 180/6.3;
180/6.7
[58] Field of Search ............... 180/6.2, 6.3, 6.7;
74/665, 682

[56] References Cited

U.S. PATENT DOCUMENTS 3,373,636  3/1968  Livezey et al. ................ 180/6.7
4,420,991  12/1983  Meyerle ....................... 180/6.7

FOREIGN PATENT DOCUMENTS

359654  3/1990  European Pat. Off. ......... 180/6.2
2239955  2/1974  Fed. Rep. of Germany ...... 180/6.2
3832529  3/1990  Fed. Rep. of Germany ...... 180/6.2

*Primary Examiner*—Mitchell J. Hill
*Attorney, Agent, or Firm*—Perman & Green

[57] ABSTRACT

A steering system for a tracked vehicle extracts a portion of power from an engine which propels the vehicle, and combines the power with the remainder of the engine power by differential gear assemblies at the tracks of the vehicle for effecting a steering movement of the vehicle while the vehicle is being propelled in either the forward or reverse direction by the engine. The steering system includes a variable hydrodynamic torque converter coupled to the engine and outputting torque via a reversing gear set to an output shaft system having gears for constraining the output shafts to rotate in opposite directions. A clutch assembly is located outside of a housing which encloses the torque converter, and includes individual clutches which are selectively activated to couple forward or reverse rotation from the reversing gear set to the output shafts for selectively steering the vehicle in a right turn or a left turn. An additional gear set and clutch system may be employed for coupling power from the engine at different selected speeds of rotation at an input to the torque converter. A blade of the torque converter is positioned in concert with selection of the optional input gears to the torque converter to establish a desired differential speed between the vehicle tracks, thereby to select a desired radius of curvature in a turning movement.

12 Claims, 4 Drawing Sheets

STEERING SYSTEM FOR TRACKED VEHICLES

BACKGROUND OF THE INVENTION

This invention relates to steering systems for tracked vehicles and, more particularly, to a steering system employing a variable hydrodynamic torque converter mechanically coupled via a set of reversing gears to a pair of output shafts, there being a set of externally mounted clutches for selectively engaging individual ones of the reversing gears.

Tracked vehicles, such as digging machines and military tanks are steered by applying a greater speed of track movement to a track on one side of the vehicle as compared to the speed of the track on the opposite side of the vehicle. Typically, the speed differential is imparted by some form of differential gearing system employing clutches for selective activation of gears which drive either the right track or the left track at the greater speed to produce a steering respectively to the left or to the right. Power for operating the steering system has been provided by hydrostatic power units employing a hydraulic piston pump. Variation in the amount of power to accomplish differing amounts of the differential speed of track movement has been accomplished by the use of hydraulic pumps in which the piston displacement may be varied as by use of a well known angled drive plate, wherein the angle of inclination of the drive plate is increased for increased displacement of the piston. For any given linear speed, forward or reverse, of the vehicle, an increase in the differential speed of the tracks decreases the radius of turning, while a decrease in the differential speed of the tracks increases the radius of turning.

A problem arises in that the construction of the foregoing steering system has been unduly expensive, both in terms of initial construction and in terms of maintenance. In addition, a change in turning radius cannot generally be established as readily as is accomplished in the steering of other types of vehicles, such as an automobile.

SUMMARY OF THE INVENTION

The foregoing problem is overcome and other advantages are provided by a steering system for a tracked vehicle which, in accordance with the invention, is connected by differential gear assemblies to the main drive transmission for outputting a differential steering torque to the track drive wheels during both forward and reverse travel of the vehicle. The steering system and the main transmission share power from a common power source, the engine which propels the vehicle, and enables the vehicle to turn to the right and to the left with varying radii of curvature in response to a steering command given by a person driving the vehicle. The steering system is capable of drawing varying amounts of power from the vehicle's engine at any vehicle speed to establish a desired differential speed between the left track and the right track of the vehicle, thereby to accomplish a desired turning radius.

In accordance with the invention, the steering system includes a hydrodynamic torque converter driven by the engine via an optional clutch actuated gear set for selection of a desired input rotational speed. Output power from the torque converter is extracted by a set of reversing gears which are selectable by a set of clutches to impart clockwise or counter-clockwise rotation of output shafts of the steering system. The output shafts provide a differential rotation which is coupled via the differential gear assemblies to the respective tracks. A further feature of the invention is a mounting of the reversing-gear clutches outside of a housing which encloses the converter and the gears connected thereto to facilitate cooling and maintenance of the reversing-gear clutches. A clutch is employed to lock the steering system when zero differential speed between the two vehicle tracks is desired to maintain straight-line movement of the vehicle. An electronic controller, responsive to a steering wheel operated by a driver of the vehicle provides electrical commands activating the various clutches and a fluid control blade of the torque converter to establish a desired differential speed between the vehicle tracks.

BRIEF DESCRIPTION OF THE DRAWING

The foregoing aspects and other features of the invention are explained in the following description, taken in connection with the accompanying drawing wherein.

DETAILED DESCRIPTION

Figure 1:
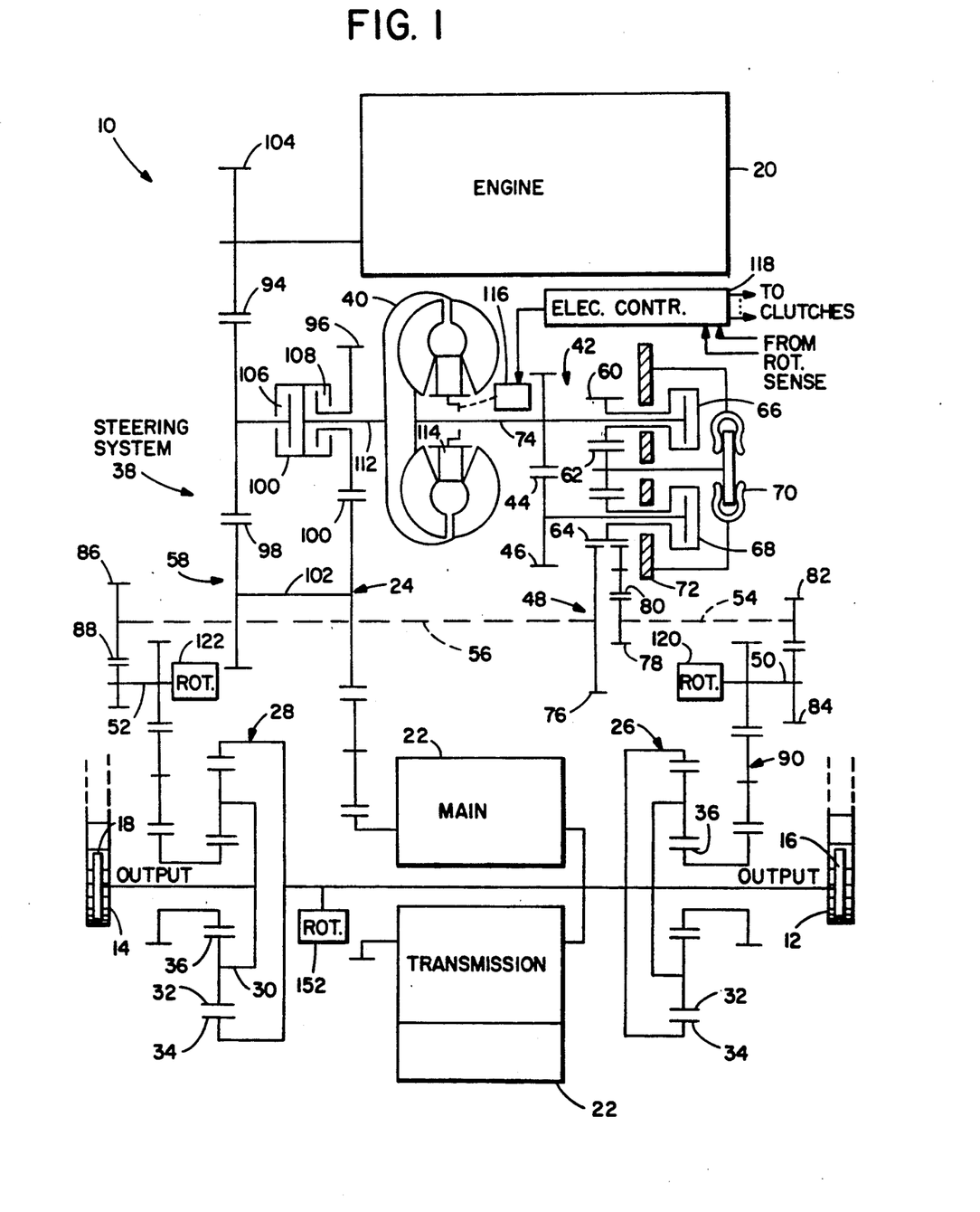
FIG. 1 is a mechanical schematic drawing of the steering system of the invention, the figure also showing an interconnection of the steering system with an engine and a main transmission which propels a tracked vehicle.

With reference to FIG. 1, there is shown a tracked vehicle 10 having a pair of tracks 12 and 14 driven, respectively, by sprocket wheels 16 and 18 disposed respectively on right and left sides of the vehicle 10. The diagrammatic view of the vehicle 10 presented in FIG. 1 shows only those components of the vehicle necessary for an understanding of steering and propulsion of the vehicle. Included with the vehicle 10 are an engine 20 and a main transmission 22 which are connected together by a gear train 24 for propelling the vehicle 10. Power from the engine 20 is coupled via the gear train 24 to the main transmission 22, and then via a pair of differential gear assemblies 26 and 28, respectively, to the sprocket wheels 16 and 18. Each of the differential gear assemblies 26 and 28 is constructed in planetary form with a spider assembly 30 carrying a set of spider gears 32 disposed between an outer circumferential gear 34 and a central gear 36. The planetary form of differential gear assembly is preferred because of its great strength for imparting output drive torque to the sprocket wheels 16 and 18 and their respective tracks 12 and 14.

In accordance with the invention, a steering system 38 is connected by the differential gear assemblies 26 and 28 to the sprocket wheels 16 and 18 for imparting a differential rotational speed to the two sprocket wheels 16 and 18. The differential gear assemblies 26 and 28 serve to combine rotational speed outputted by the main transmission 22 with a differential rotational speed outputted by the steering system 38 for driving the sprocket wheels 16 and 18 at different speeds of rotation during a turning of the vehicle 10. Power for operating the steering system 38 is provided by the engine 20 through gears of the gear train 24. The amount of differential rotational speed outputted by the steering systems 38 is adjustable, in accordance with a feature of the invention as will be described hereinafter. The differential rotational speed is increased for smaller turning radii and decreased for larger turning radii of the vehicle 10, the steering system 38 outputting zero differential rotational speed for straight ahead and straight reverse movements of the vehicle 10.

The arrangement of the interconnection of the main transmission 22 and the steering system 38 by the differential gear assemblies 26 and 28 is shown by way of example in a preferred embodiment, it being understood that other differential gearing may be employed for the combining of the rotations outputted by the steering system 38 and the main transmission 22. As shown in FIG. 1, the main transmission 22 connects at its output to the outer gears 34 of each of the assemblies 26 and 28, the steering system 38 connects with the central gear 36 in each of the assemblies 26 and 28, and the sprocket wheels 16 and 18 connect via a shaft passing through a central bore of the central gear 36 to the spider assembly 30 in each of the differential gear assemblies 36 and 38. Thereby, the spider assembly 30 in each differential gear assembly 26, 28 is made to rotate at a rate proportional to the algebraic sum of the rotational speeds outputted by the main transmission 22 and the steering system 38.

In accordance with a feature of the invention, the steering system 38 comprises a variable hydrodynamic torque converter 40, a first set of gears 42 including first and second reversing gears 44 and 46, and a second set of gears 48 including counter rotation output shafts 50 and 52 located respectively on right and left sides of the vehicle 10 with connecting shafts 54 and 56 for connecting steering power to both sides of the vehicle 10. Also shown in FIG. 1 is an optional third set of gears 58 which, in part, includes gears from the gear train 24 for inputting power from the engine 20 at different rotational speeds to the torque converter 40.

First gear set 42 further comprises a series of three interconnected gears 60, 62, and 64 which are connectable by a first set of clutches 66 and 68 to the reversing gears 44 AND 46, respectively. The clutches 66 and 68 are individually activatable, as will be described hereinafter. When activated, the clutch 66 connects the gear 60 to the gear 44. When activated, the clutch 68 connects the gear 64 with the gear 46. A third clutch 70, upon activation, locks the gear 62 to a housing 72 and, upon deactivation, allows the gear 62 to rotate relative to the housing 72. The housing 72 encloses the first gear set 42 and the torque converter 40 and, if desired, may be formed as a transmission case enclosing the second and the third gear sets 48 and 58, and the main transmission 22.

A feature of the invention is the location of the first set of clutches 66, 68, and 70 outside of the housing 72 to facilitate maintenance of the steering system 38, and to facilitate cooling of the clutches 66, 68, and 70. Activation of the clutch 66 causes the gears 60 and 64 to rotate in the same direction as the gear 44 connected to an output shaft 74 of the torque converter 40. Activation of the clutch 68 causes the gears 60 and 64 to rotate in the same direction as the gear 46, this being in the opposite direction to the output shaft 74 of the torque converter 40. The gear 62 which couples together the two gears 60 and 64 rotates in the reverse direction to the two gears 60 and 64. The gear 64 applies output rotation from the first gear set 42 to the second gear set 48.

In accordance with the operation of the steering system 38, the direction of rotation of the gear 64 determines the direction of turning of the vehicle 10. In the event that the gear 64 is stationary, then there is no turning of the vehicle 10, and the vehicle 10 advances either straight forward or straight reverse depending on whether forward or reverse direction has been selected in well-known fashion by use of the main transmission 22. The speed of rotation of the gear 64 is converted by the gear set 48 to a differential speed of rotation applied via the differential gear assemblies 26 and 28 to the sprocket wheels 16 and 18.

The direction of rotation of the gear 64 and, therefore, the direction of turning of the vehicle 10, are selected by operation of the first set of clutches 66, 68, and 70. As noted above, activation of only the clutch 66 introduces one direction of rotation of the gear 64, while activation of only the clutch 68 introduces the opposite direction of rotation gear 64. Assuming that the first-mentioned direction of rotation of the gears 64 introduces a right turn to the vehicular motion, then activation of the clutch 66 causes the vehicle 10 to turn right, while activation of the clutch 68 causes the vehicle 10 to turn left. In the event that both clutches 66 and 68 would be simultaneously activated, then the gears of the first gear set 42 would be locked and the gear 64 would be stationary. Therefore, simultaneous activation of the two clutches 66 and 68 introduces straight-line motion to the vehicle 10. During sustained periods of straight-line movement of the vehicle 10, the locking clutch 70 is activated to lock the gears of the first gear set 42 to the housing 72 thereby to permit a releasing of the clutches 66 and 68 to decrease a wearing of the clutches 66 and 68 and increasing their longevity.

The second gear set 48 further comprises a gear 76 which is directly connected to the gear 64, and a gear 78 which is connected via an idler gear 80 to the gear 64. This arrangement of the three gears 76, 78, and 80 imparts opposite directions of rotation to the gears 76 and 78. The gear 76 drives the connecting shaft 56, and the gear 78 drives the connecting shaft 54, the directions of rotation of the shafts 54 and 56 being in opposite directions due to the opposed directions of the rotation of the gears 78 and 76. The rates of rotation of the two gears 78 and 76 differ because of the different sizes of the gears, as indicated in FIG. 1, and accordingly, the second gear set 48 is provided with additional gears 82 and 84 on the right side of the vehicle 10 and two gears 86 and 88 on the left side of the vehicle 10 for coupling rotation of the connecting shafts 54 and 56 to the output shafts 50 and 52, respectively, and for equalizing rates of rotation of the output shafts 50 and 52. Gear 82 is connected by shaft 54 to gear 78, and drives gear 84 which is connected to output shaft 50. Gear 86 is connected by shaft 56 to gear 76, and drives gear 88 which is connected to output shaft 52. Gears 82 and 84 provide a step-down speed ratio, and gears 86 and 88 provide a step-up gear speed ratio to compensate for the different rates of rotation of the gears 78 and 76, thereby to equalize the rates of rotation of the output shafts 50 and 52, while retaining their counter rotation. Rotation of shaft 50 is coupled to the central gear 36 of the differential gear assembly 26 by a gear train 90, and rotation of the output shaft 52 is coupled to the central gear 36 of the differential gear assembly 28 by a gear train 92.

The third gear set 58 comprises a gear 94 and a gear 96 which are mechanically connected by two gears 98 and 100 of differing diameter, and which are joined together by a shaft 102. The gear 94 is driven by an output gear 104 of the engine 120 and, via the gears 98 and 100 drives the gear 96. The gears 98 and 100 provide for a step-up ratio in the speed of rotation of the gear 96 relative to the gear 94. The gears 104, 94, 98, and 100 constitute a part of the aforementioned gear train 24 which couples power from the engine 20 to the main transmission 22.

A second clutch assembly comprising clutches 106, and 108 in a common housing 110 interconnect the gears 94 and 96 to an input shaft 112 of the torque converter 140. Activation of the clutch 106 with deactivation of the clutch 108 provides for a direct connection of the gear 94 to the torque converter 140 and provides for rotation of the input shaft 112 at the same rotational speed as the gear 94. Activation of the clutch 108 with deactivation of the clutch 106 provides for a direct connection of the gear 96 to the torque converter 4 and rotation of the input shaft 112 at the same rotational speed as the gear 96. Thereby, by selective activation of the clutches 106 and 108, the input shaft 112 of the torque converter 40 can receive power from the engine 20 by low-speed clutch 106, at a lower rotation rate, namely, the rotation rate of the gear 94 or by high-speed clutch 108 at a higher rotation rate, namely, the rotation rate of the gear 96. In this way, when desired, the torque converter 40 can be driven at higher rates of rotation without necessitating an overspeeding of the engine 20.

The torque converter 40 includes a variable pitch blade 114 driven by an electromechanical actuator 116. By varying the pitch of the blade 114, the fluid coupling between stator and rotor of the converter 40 is adjusted, thereby to adjust the amount of power flow between input shaft 112 and output shaft 74 of the converter 40. By closing the blade 114 completely, there is no power transfer from the input shaft 112 to the output shaft 74, and the rotor free wheels past the stator with no more than minimal power dissipation within the converter 40. The actuator 116 is operated to provide a desired amount of power flow between the input and output shafts 112 and 74 to provide for a desired radius of turn of the vehicle 10, a relatively small amount of power providing a relatively large turning radius while a relatively large amount of power provides for a relatively small turning radius for a given vehicle speed. The amount of power available to be outputted by the torque converter 40 is also dependent on the speed of the input shaft 112. Thus, additional power can be obtained by increasing the speed of the engine 20, and also by activating the clutch 108 and deactivating the clutch 106.

In the foregoing operational description, it has been shown that selection of a turning direction is provided by operation of the clutches 66, 68, and 70 of the first clutch assembly. The turning radius is selected by operation of the blade actuator 116 and the optional clutches 106 and 108 of the second clutch assembly. Operation of all five of the foregoing clutches and the actuator 116 is under control of an electronic controller 118 which is responsive to a steering command inputted by a person driving the vehicle 10. The controller 118 operates in a feedback fashion by use of rotational speed information provided by rotation sensors 120 and 122 connected to the output shafts 50 and 52, respectively.

Figure 2:
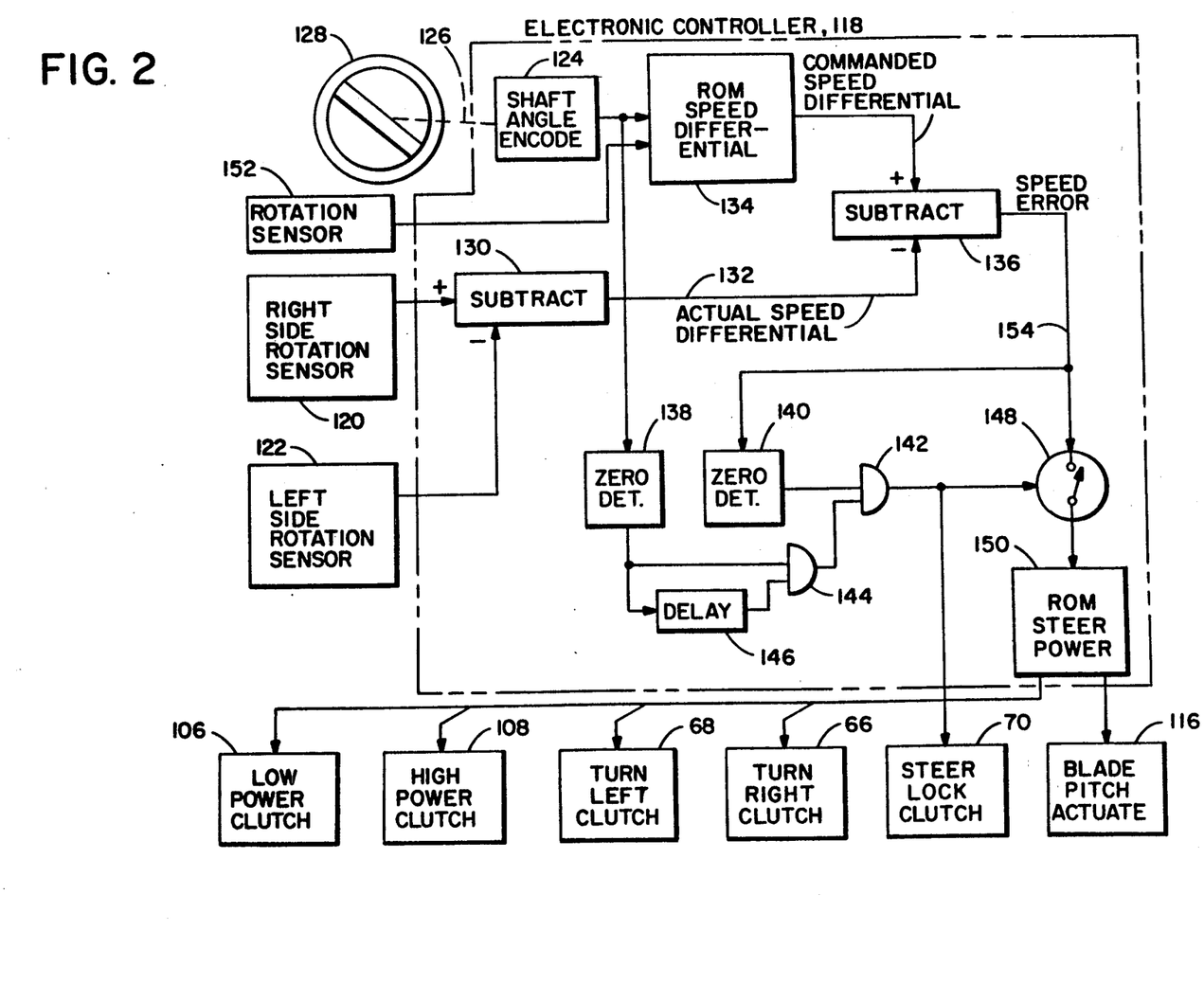
FIG. 2 is a block diagram of an electronic controller of the steering system of FIG. 1.

With reference to FIG. 2, the electronic controller 118 includes a shaft angle encoder 124 mechanically connected, as indicated by a dashed line 126 to a steering wheel 128 of the vehicle 10, the steering wheel 128 being employed by a person driving the vehicle 10 for steering the vehicle 10. The controller 118 outputs electric signals for operating the low power clutch 106, the high power clutch 108, the left turn clutch 68, the right turn clutch 66, the steering lock clutch 70 and the blade pitch actuator 116. A subtractor 130 within the controller 118 subtracts an electric signal outputted by the left-side rotation sensor 122 from an electric signal outputted by the right-side rotation sensor 120 to provide on line 132 the differential speed actually being applied by the steering system 38 via the differential gear assemblies 26 and 28 to the sprocket wheels 16 and 18. The controller 118 further comprises a read-only memory 134, a further subtractor 136, two detectors 138 and 140, two AND gates 142 and 144, a delay unit 146, a switch 148, and read-only memory 150.

In operation, the encoder 124 outputs a digital electronic signal to the memory 134, the signal designating the angular orientation of the steering wheel 128 and also serving as an address to the memory 134. Additional address to the memory 134 is provided by a rotation sensor 152 on the output shaft of the main transmission 22 (FIG. 1). The memory 134 stores values of differential speed to be outputted by the steering system 38 to the sprocket wheels 16 and 18 for a specific value of turning radius at each of a plurality of values of vehicle speed. The stored values are addressed by the composite address signal of the shaft angle encoder 124 and the rotation sensor 152. In accordance with the address, the memory 134 outputs a commanded value of differential speed which the steering system 38 is to accomplish in order to provide a vehicular turn of desired turning radius. By way of example, values of differential speed in increments of 0.1 miles per hour from 0.0 miles per hour to 2.0 miles per hour, and in increments of 0.2 miles per hour from 2.0 miles per hour to 3.0 miles per hour. The foregoing range of stored values would be addressed for different combinations of steering wheel angle and transmission shaft speed to provide a turning movement with a desired turning radius. For example, at a transmission shaft speed corresponding to a vehicular speed of 5 miles per hour, a differential speed of 0.5 miles per hour would have as much effect on a turning maneuver as a differential speed of 3.0 miles per hour at a vehicular speed of 30 miles per hour. This may be envisioned by considering the case in which the vehicle travels in a circle, in which case the outside track travels a greater distance than the inside track during the same interval of time. If the difference between the inner and outer radii of the circular paths traversed by the inner and outer tracks would be equal to one-tenth of the mean radius of the circle, then the differential speed would be one-tenth of the vehicular speed. Therefore, the differential speed of 0.5 miles per hour for a vehicular speed of 5 miles per hour would produce the same turning radius as a differential speed of 3.0 miles per hour at a vehicular speed of 30 miles per hour.

Therefore, a separate set of commanded differential speed is stored for each of a plurality of vehicular speeds. For example, the sets of commanded differential speeds may be stored at vehicular speeds from zero to 30 miles per hour in increments of 3 miles per hour of vehicular speed, the vehicular speeds being represented by the rotation rate of the main transmission output shaft as sensed by the rotation sensor 152. The value of commanded differential speed stored in the memory 134 may be obtained by prior calculation, or may be based on experimentally measured turn radii.

At the subtractor 136, the actual differential speed on the line 132 is subtracted from the commanded differential speed to provide a speed error on line 154. The error signal on line 154 is applied via switch 148 to address the memory 150. In response to the value of the error signal, the memory 150 output a stored signal which activates either of the clutches 66 and 68 in the event that a right turn or left turn is requested, In addition, the memory 150 sends a command signal to the actuator 116 requesting a specific value of blade pitch in the torque converter 40. In the case of a large error signal on line 154, a large blade pitch is requested. In the case of only a small speed error, a small blade pitch is requested. In the event that the optional clutches 106 and 108 are employed, the memory 150 outputs a signal activating the low power clutch 106 for small error signals, and outputs a signal activating the high power clutch 108 during large values of error signal. Only one of the two clutches 106 and 108 is activated at any one time.

When zero error signal is attained, both of the clutches 66 and 68 are activated to lock the steering gear and to hold the vehicle on a straight line course. For sustained straight line driving, the steering lock clutch 70 is activated by use of the detectors 138 and 140, the gates 142 and 144, and the delay unit 146 in the following manner. The detector 138 detects a zero shaft angle of the steering wheel 128 indicating a desired straight line course of travel. The detector 140 detects the presence of a zero error signal on line 154. The presence of a zero angle of steering wheel 128 is communicated from the output of the detector 138 directly to an input terminal of the AND gate 144 and, via the delay unit 146 to a second input terminal of the gate 144. When both input terminals show a logic state of 1, the gate 144 outputs a logic-1 signal to an input terminal of the AND gate 142. The output signal of the gate 144 indicates that the steering wheel 128 is being retained at a position of zero degrees over an interval of time at least as long as a delay imparted by the delay unit 146. Therefore, the gate 144 signifies the driver's intention to travel in a straight line. By applying an output signal of the detector 140 to a second input terminal of the gate 142, in addition to the signal applied to the first input terminal from the gate 144, the gate 142 outputs a logic-1 signal indicating that the driver wishes to travel in a straight line, and that the vehicle is actually travelling in a straight line.

The output signal of the gate 142 is applied to the clutch 70 to activate the clutch to lock their first gear set 42. At the same time, the signal outputted by the gate 142 operates the switch 148 to place the switch 148 in an open condition, thereby removing the error signal from the memory 150. As a result, the memory 150 discontinues outputting of the activating signals to each of the clutches 66, 68, 106, and 108 as well as the signal to operate the actuator 116. Thereupon, the foregoing four clutches are deactivated, and the actuator 116 closes the blade 114 of the torque converter to prevent further flow of power from the input shaft 112 to the output shaft 74 of the converter 40. Upon subsequent movement of the steering wheel by the driver, the zero detector 138 outputs a logic-0 resulting in activation of the gates 144 and 142 to release the steering-lock clutch 70, and to close the switch 148 to reconnect the memory 150 to the speed error signal from the subtractor 136.

Figure 3:
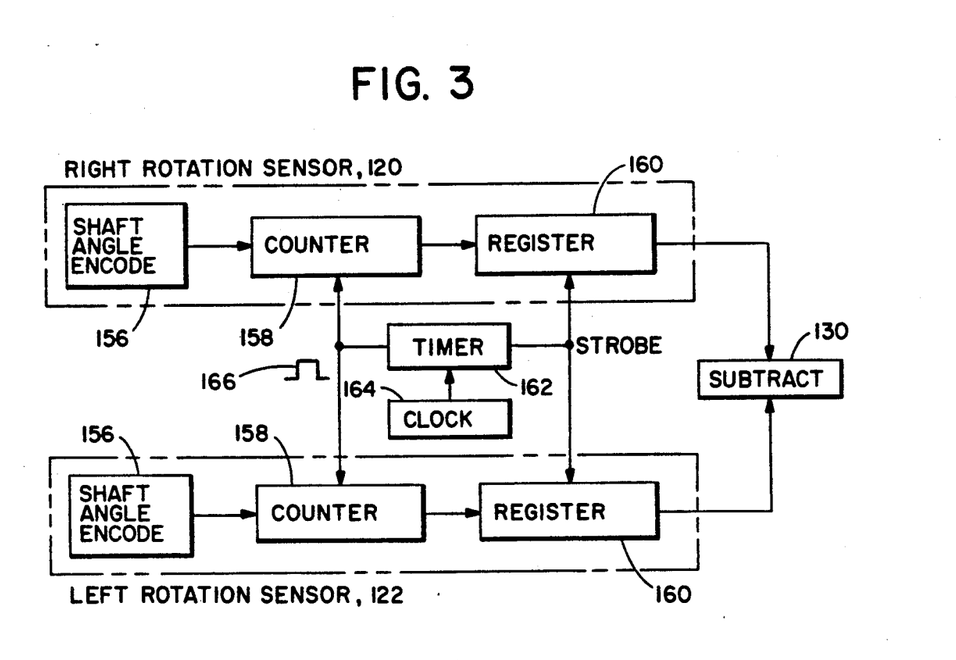
FIG. 3 is a block diagram showing details in the construction of rotation sensors of FIGS. 1 and 2, and their interconnections with other elements of the electronic controller.

FIG. 3 shows details in the construction of the rotation sensors 120 and 122. The construction of all three of the rotation sensors, 120, 122, and 152 are the same, it being understood that the explanation provided by FIG. 3 with reference to the sensors 120 and 122 applies also to the construction of the sensor 152. As shown in FIG. 3, each of the sensors 120 and 122 comprises a shaft angle encoder 156, a digital counter 158, and a register 160. The controller 118 further comprises a timer 162 driven by a clock 164, and outputs timing signals which drive the counters 158, and strobe the registers 160. Also shown in FIG. 3 is the subtractor 130 of FIG. 2, which subtractor receives the signals outputted by the two sensors 120 and 122 to form the difference as has been described hereinabove.

In operation, the counter 158 in the sensor 120 counts pulses in a train of pulses outputted by the least significant bit in the digital signal of the encoder 156, which pulse train is present during rotation of the output shaft 50 (FIG. 1). The counting continues during an interval of time designated by an enable pulse 166 outputted by the timer 162. Higher rotational speeds introduce a higher pulse repetition frequency with a consequentially larger count by the counter 158. Therefore, at the conclusion of each measurement interval designated by a pulse 166, the output count is proportional to the speed of the shaft 50. Similar comments apply to the operation of the sensor 122 with respect to the speed of the shaft 52, and to the sensor 152 with respect to the output shaft speed of the main transmission 22. The timer 162 strobes the register 160 to read the count outputted by the counter 158 at the conclusion of the measurement interval, and then terminates the enable pulse 166 to terminate the measurement interval and to reset the counter 158 to zero. The numbers stored in the registers 160 in each of the sensors are proportional to the rotational speeds of the respective shafts and, therefore, are employed by the steering system 38 to form a signal on line 132 (FIG. 2) representing the actual differential speed.

Figure 4:
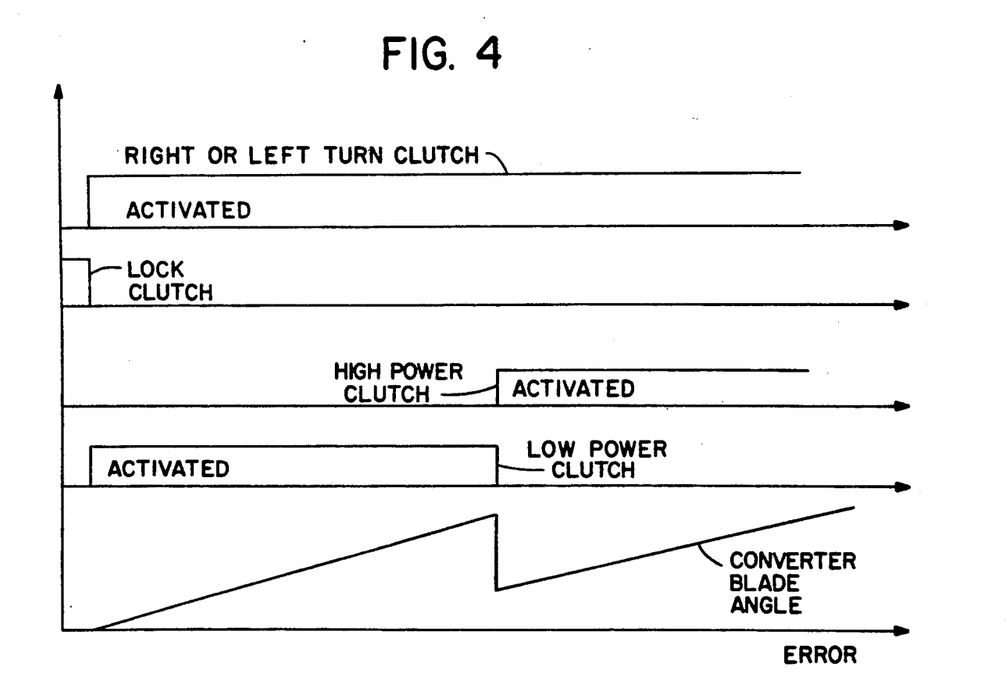
FIG. 4 is a diagram showing activation of clutches and a hydrodynamic torque converter of FIG. 1 by the electronic controller of FIG. 2 as a function of a differential speed error signal in a feedback loop of the steering system.

FIG. 4 provides further explanation in the operation of the memory 150 of FIG. 2. The top trace of the graph of FIG. 4 indicates activation of one of the turn clutches 66 and 68 as a function of the speed error signal on line 154. For zero error, the clutch is deactivated. However, upon attainment of sufficient error to provide a nonzero value for the least significant bit of the speed error, the memory 150 is addressed to activate the turn clutch 66 or 68 depending in whether a right turn or left turn is indicated.

In the second trace of the graph of FIG. 4, the steering-lock clutch 70 may have been activated during a prolonged interval of forward (or reverse) movement along a straight line. Upon deviation of the steering wheel 128 a sufficient amount to produce a nonzero value in the least significant bit of the encoder 124, the detector 138 is activated to provide a signal via the gates 144 and 142 to release the clutch 70. Thus, as shown in FIG. 4, the releasing of the clutch 70 occurs for the same value of error as does the activation of a turn clutch.

The next two traces in the graph of FIG. 4 show activation of the power clutches 106 and 108. The fourth trace shows that the low power clutch 106 is activated upon deactivation of the lock clutch 70, and remains activated during a low range of error signals. For higher values of error signal, the low power clutch 106 is deactivated and the higher power clutch 108 is activated as shown in the third trace.

The bottom trace in the graph of FIG. 4 show value of commanded blade pitch applied by the memory 150 to the actuator 116. The signal applied to the actuator 116 increases in value beginning with actuation of a turn clutch and the low power clutch, and continues to increase through the low range of error signals. During the transition from the low power clutch to the high power clutch, at which time the gear ratio of the second gear set 48 (FIG. 1) changes, the command signal to the actuator 116 drops to a lower value to insure a smooth transition of power during the gear change. Thereafter, the command signal to the actuator 116 continues to increase with increasing values of error signal.

Figure 5:
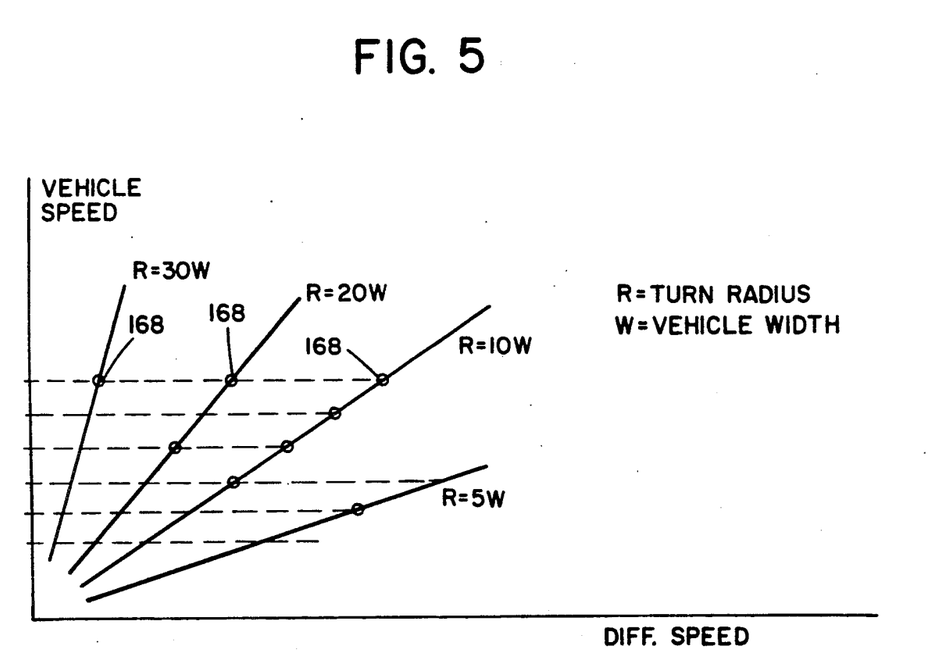
FIG. 5 is a graph showing stored values of differential speed to be employed by the steering system of the invention in accomplishing various turning radii.

FIG. 5 is a graph showing a relationship between vehicle speed, differential speed and a turning radius as a function of the vehicle width. It is assumed that the vehicle width is equal to the distance between centers of the vehicle tracks 12 and 14. As was described above, for a given radius of curvature, a larger differential speed is associated with a larger vehicle speed. In the construction of the graph of FIG. 5, the horizontal axis representing the differential speed is expanded in scale relative to the vertical axis to facilitate a portrayal of the relationship between the speeds and the turning radius. The graph shows that, for a given differential speed, the turning radius increases linearly with increased vehicle speed. With respect to the storage of differential speed data in the memory 134 of FIG. 2, each dashed horizontal line in FIG. 5 represents a possible set of addresses to the memory 134 for outputting a specific value of differential speed. As has been described hereinabove, the address is composed of a signal from the rotation sensor 152 representing vehicle speed, and a signal from the steering wheel encoder 124 representing a desired radius of turn. Each circle 168 at the intersection of a dashed line and a solid line represents the address of a storage location within the memory 134, at which locations are stored values of differential speed indicated on the horizontal axis of the graph. Only a few locations of many possible locations are indicated in the graph, it being understood that the locations of the circles 168 are somewhat approximate due to digital quantization of the address signals.

In view of the foregoing description, it is apparent that the steering system 38 of the invention, when combined with other elements of a tracked vehicle transmission, can perform all steering functions at varying radii including vehicle pivot in both propulsive and coast modes, as well as in forward and reverse drive. The steering system 38 takes advantage of low cost standard automotive transmission components and modern control technology to achieve high quality steering which, heretofore, has necessitated the use of high precision, high pressure hydrostatic systems of considerable cost and complexity. The present system is simplified in that no planetary gears are required within the first, second, and third gear sets 42, 48 and 58. Only simple spur gears of minimal gear count need be employed.

In the provision of the steering function by use of the two clutches 66 and 68, it is noted that the clutches are operated in either an engaged or disengaged position, there being no sustained slippage. Due to the mounting of the clutches 66, 68 and 70 outside of the housing 72 of the transmission case, these clutches may be cooled by ambient air. They may be actuated by air, oil or electricity. While the mounting of the clutches external to the housing 72 eases replacement of consumption elements, it should be noted that the parts subjected to wear are consumed only relative to steering cycles and not relative to steering loads nor energy rejection.

The feature of the invention, wherein the clutches 66, 68 and 70 of the first clutch assembly are disposed outside the housing 72 of the transmission is accomplished by the geometric arrangement of the gears 60, 62, and 64, as shown in FIG. 1, wherein the axes of these gears are parallel, and wherein the shaft 74 and a shaft supporting the gear 60 are coaxially disposed so as to facilitate passage through an opening in the housing 72 to connect with the clutch 66. Similarly, shafts supporting the gears 46 and 64 are disposed coaxially to each other to facilitate passage through an opening in the housing 72 to connect with the clutch 68. Also, by providing for a parallel relationship of the shaft connecting gear 62 and clutch 70, the clutch 70 can be placed alongside the clutches 66 and 68 so that all three clutches may be positioned in a common location of convenience for servicing. As a further advantage, the foregoing arrangement of the serial connection of the three gears 60, 62, and 64 interconnected to the serial arrangement of the two reversing gears 44 and 46 enables the locking of the steering system 38 by use of the single clutch 70 connected to the gear 62.

It is to be understood that the above described embodiment of the invention is illustrative only, and that modifications thereof may occur to those skilled in the art. Accordingly, this invention is not to be limited to the embodiment disclosed herein, but is to be limited only as defined by the appended claims.

What is claimed is:

1. A steering system for a tracked vehicle comprising:
   a variable source of torque including a variable torque converter responsive to an input power source;
   a first gear set comprising a first and a second reversing gear, output torque of said torque source being applied to said first gear set;
   an output shaft system comprising a pair of output shafts directed to opposed sides of said vehicle for applying turning power to right and left tracks of said vehicle during a turning maneuver, said output shaft system including a second gear set for directing said pair of shafts in opposite directions of rotation;
   a clutch set interconnecting said first gear set to said second gear set, said clutch set including a right-turn clutch connected to said first reversing gear and a left-turn clutch connected to said second reversing gear, said right-turn clutch connecting rotational power from said first reversing gear to said second gear set upon activation of said right-turn clutch, said left-turn clutch connecting rotational power from said second reversing gear to said second gear set upon activation of said left-turn clutch; and
   activating means coupled to said torque source and to said clutch set for activating one of said clutches to effect a right or left turning movement of said vehicle, said activating means being responsive to a turning command signal for activating said torque source to apply torque to said first gear set for rotating gears of said first gear set at a desired speed; and wherein said variable torque converter includes a blade assembly having at least one blade, a position of the blade being set by said activating means.

2. A steering system according to claim 1 wherein said torque source comprises a variable power coupler for selectively coupling power from said power source to said torque converter.

3. A steering system according to claim 2 wherein said variable power coupler comprises:

a third gear set applying power to said torque converter via a plurality of input shaft rotating at different speeds; and a second clutch set including a high speed clutch and a low speed clutch coupled to respective ones of said input shafts of said third gear set rotating at higher and lower speeds, activation of alternately said high speed and low speed clutches applying an input power to said torque converter at, respectively, a higher rate and a lower rate of rotation.

4. A steering system according to claim 2 further comprising a housing enclosing said torque converter, clutches of said clutch set lying outside of said housing to facilitate cooling and maintenance of the clutches.

5. A steering system according to claim 1 wherein said clutch set further comprises a locking clutch secured to a gear of said first gear set for locking rotation of said first gear set upon activation of said locking clutch by said activating means.

6. A steering system according to claim 1 wherein said vehicle includes transmission means for coupling power from an input power source to tracks of said vehicle, said steering system further comprising differential means for adding rotation of the output shaft of said output shaft system to an output rotation of said transmission means, an output rotation of said differential means being applied to the driving of said tracks.

7. A steering system according to claim 1 further comprising sensor means for sensing rotation speed of said pair of output shafts of said output shaft system, said sensor means providing data of differential speed between said pair of shafts.

8. A steering system for a tracked vehicle comprising:

a variable source of torque;

a first gear set comprising a first and a second reversing gear, output torque of said torque source being applied to said first gear set;

an output shaft system comprising a pair of output shafts directed to opposed sides of said vehicle for applying turning power to right and left tracks of said vehicle during a turning maneuver, said output shaft system including a second gear set for directing said pair of shafts in opposite directions of rotation;

a clutch set interconnecting said first gear set to said second gear set, said clutch set including a right-turn clutch connected to said first reversing gear and a left-turn clutch connected to said second reversing gear, said right-turn clutch connecting rotational power from said first reversing gear to said second gear set upon activation of said right-turn clutch, said left-turn clutch connecting rotation power from said second reversing gear to said second gear set upon activation of said left-turn clutch;

activating means coupled to said torque source and to said clutch set for activating one of said clutches to effect a right or left turning movement of said vehicle, said activating means being responsive to a turning command signal for activating said torque source to apply torque to said first gear set for rotating gears of said first gear set at a desired speed;

a variable torque converter responsive to an input power source;

a variable power coupler for selectively coupling power from said power source to said torque converter;

a third gear set applying power to said torque converter via a plurality of input shafts rotating at different speeds; and a second clutch set including a high speed clutch and a low speed clutch coupled to respective ones of said input shafts of said third gear set rotating at higher and lower speeds, activation of alternately said high speed and low speed clutches applying an input power to said torque converter at, respectively, a higher rate and a lower rate of rotation;

wherein said variable torque converter includes a blade assembly having at least one blade, a position of the blade being set by said activating means in concert with a selective activation of said high speed clutch and said low speed clutch by said activating means.

9. A steering system according to claim 8 further comprising:

a housing enclosing said torque converter, clutches of said first-mentioned clutch set lying outside of said housing to facilitate cooling and maintenance of said first clutch set; and wherein said first clutch set further comprises a locking clutch secured to a gear of said first gear set for locking rotation of said first gear set upon activation of said locking clutch by said activating means;

said vehicle includes transmission means for coupling power from an input power source to tracks of said vehicle, said steering system further comprising differential means for adding rotation of the output shafts of said output shaft system to an output rotation of said transmission means, an output rotation of said differential means being applied to the driving of said tracks; and said steering system further comprises sensor means for sensing rotation speeds of said pair of output shafts of said output shaft system, said sensor means providing feedback signals to said activating means for precise control of differential speed between said pair of output shafts.

10. A steering system for a tracked vehicle comprising:

a variable torque converter responsive to an input power source;

a first gear set comprising a first and a second reversing gear, output torque of said torque converter being applied to said first gear set;

an output shaft system comprising a pair of output shafts directed to opposed sides of said vehicle for applying turning power to right and left tracks of said vehicle during a turning maneuver, said output shaft system including a second gear set for directing said pair of shafts in opposite directions of rotation;

a clutch set interconnecting said first gear set to said second gear set, said clutch set including a right-turn clutch connected to said first reversing gear and a left-turn clutch connected to said second reversing gear, said right-turn clutch connecting rotational power from said first reversing gear to said second gear set upon activation of said right-turn clutch, said left-turn clutch connecting rotational power from said second reversing gear to said second gear set upon activation of said left-turn clutch;

activating means coupled to said torque converter and to said clutch set for activating one of said clutches to effect a right or left turning movement of said vehicle, said activating means being responsive to a turning command signal for activating said torque converter to apply torque to said first gear set for rotating gears of said first gear set to output power therefrom at a desired speed; and a housing enclosing said torque converter, clutches of said clutch set lying outside of said housing to facilitate cooling and maintenance of said clutch system.

11. A steering system for a tracked vehicle comprising:

a variable torque converter responsive to an input power source;

a first gear set comprising a first and a second reversing gear, output torque of said torque converter being applied to said first gear set;

an output shaft system comprising a pair of output shafts directed to opposed sides of said vehicle for applying turning power to right and left tracks of said vehicle during a turning maneuver, said output shaft system including a second gear set for directing said pair of shafts in opposite directions of rotation;

a clutch set interconnecting said first gear set to said second gear set, said clutch set including a right-turn clutch connected to said first reversing gear and a left-turn clutch, connected to said second reversing gear, said right-turn clutch connecting rotational power from said first reversing gear to said second gear set upon activation of said right-turn clutch, said left-turn clutch connecting rotational power from said second reversing gear to said second gear set upon activation of said left-turn clutch;

activating means coupled to said torque converter and to said clutch set for activating one of said clutches to effect a right or left turning movement of said vehicle, said activating means being responsive to a turning command signal for activating said torque converter to apply torque to said first gear set for rotating gears of said first gear set to output power therefrom at a desired speed;

a housing enclosing said torque converter, clutches of said clutch set lying outside of said housing to facilitate cooling and maintenance of said clutch set;

wherein said variable toque converter includes a blade assembly having at least one blade, a position of the blade being set by said activating means, said steering system further comprising sensor means for sensing rotational speeds of said pair of output shafts of said output shaft system, said sensor means providing feedback signals to said activating means for precise control of differential speed between said pair of output shafts.

12. A steering system for a tracked vehicle comprising:

a variable source of torque having a torque converter responsive to an input power source;

a first gear set comprising a first and a second reversing gear, output torque of said torque source being applied to said first gear set;

an output shaft system comprising a pair of output shafts directed to opposed sides of said vehicle for applying turning power to right and left tracks of said vehicle during a turning maneuver, said output shaft system including a second gear set for directing said pair of shafts in opposite directions of rotation;

a set of clutches interconnecting said first gear set to said second gear set, said set of clutches including a right-turn clutch connected to said first reversing gear and a left-turn clutch connected to said second reversing gear and a third clutch operatively coupled to both said first and said second reversing gears, said right-turn clutch connecting rotational power from said first reversing gear to said second gear set upon activation of said right-turn clutch, said left-turn clutch connecting rotational power from said second reversing gear to said second gear set upon activation of said left-turn clutch, said third clutch locking together said first revering gear and said second reversing gear upon activation of said third clutch; and activating means coupled to said torque source and to said set of clutches for activating said right-turn clutch to effect a right turning movement of said vehicle, for activating said left-turn clutch to effect a left turning movement of said vehicle, and for activating said third clutch after a sustained period of straight line motion to maintain a straight-line motion of said vehicle;

wherein said activating means is responsive to a turning command signal for activating said torque source to apply torque to said first gear set for rotating gears of said first gear set at a desired speed; and said steering system further comprises a housing enclosing said torque converter, said set of clutches lying outside of said housing to facilitate cooling and maintenance of the clutches.

* * * * *